Mar. 6, 1923.

P. J. CASSIDY.
EXTRA SPARE TIRE CARRIER.
FILED SEPT. 9, 1921.

1,447,643.

Inventor.
Patrick J. Cassidy,
by Heard Smith & Tennant.
Atty's.

Patented Mar. 6, 1923.

1,447,643

UNITED STATES PATENT OFFICE.

PATRICK J. CASSIDY, OF ARLINGTON, MASSACHUSETTS.

EXTRA-SPARE-TIRE CARRIER.

Application filed September 9, 1921. Serial No. 499,405.

*To all whom it may concern:*

Be it known that I, PATRICK J. CASSIDY, a citizen of the United States, and resident of Arlington, county of Middlesex, State of Massachusetts, have invented an Improvement in Extra-Spare-Tire Carriers, of which the following description, in connection with the accompanying drawing, is a specification, like characters on the drawing representing like parts.

This invention has for its object to provide a novel device by which a second or extra spare tire can be carried on an automobile.

Automobiles are usually provided with a spare tire carrier adapted to receive an inflated spare tire but it is frequently desirable to be able to carry two inflated spare tires especially when a long trip is being made.

My invention provides a novel device adapted to be secured to the regular spare tire carrier and by which an extra or second mounted spare tire may be securely carried and retained firmly in proper position.

My improved device comprises two cradle members each having arms to embrace the regular spare tire carrier and also having other arms to embrace the rim on which the extra spare tire is mounted, and means connecting the said cradle members by which they are clamped firmly to both the regular spare tire carrier and the rim of the extra mounted spare tire.

In order to give an understanding of my invention I have illustrated in the drawings a selected embodiment thereof which will now be described after which the novel features will be pointed out in the appended claims.

In the drawings, Fig. 1 is a rear view of an automobile showing my improved tire carrier clamped to the regular spare tire carrier of the automobile.

Fig. 5 is a section on the line 5—5, Fig. 4.

Figure 1:
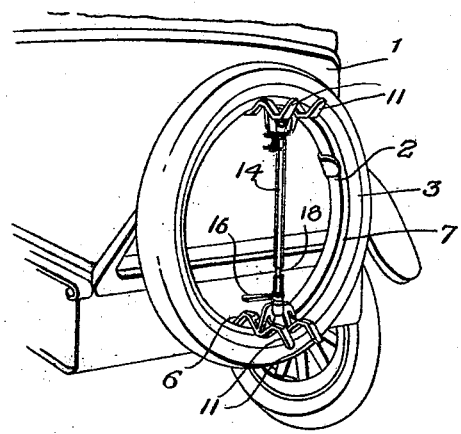

In the drawings 1 indicates an automobile and 2 indicates the regular spare tire carrier on which a mounted spare tire 3 is supported. These parts may have any suitable or usual contruction, though the particular character of the regular spare tire holder 2 will vary with different makes of automobiles.

My improved device comprises two cradle members 4 and 5, each of which is provided with two arms 6 that are shaped to embrace either the regular spare tire holder 2, if the latter is in the form of an annular member, or the rim 7 on which the extra spare tire 3 is mounted. The arms 6 may have various shapes adapted for this purpose but preferably each is formed with the two inclined portions 8 and the connecting bridge portion 9, said portions 8 and 9 being constructed to fit around and partially embrace the rim 7 of the regular spare tire. The two arms 6 of each cradle member are connected by the bridge or connecting portion 10. Each cradle member also comprises two other arms 11 similar to the arms 6 but extending in opposite directions to said arms 6. Each of the arms 11 have the inclined portions 8 and the central or bridge portion 9 and these arms are shaped to embrace the automobile rim 12 on which an extra spare tire 13 is mounted. Each cradle member has a general H-shape with one arm 6 and one arm 11 forming one side of the H, the other arm 6 and the other arm 11 forming the other side thereof, and the bridge portion 10 forming the connecting portion.

The cradle members are connected by a rod 14 which has screw-threaded engagement with the connecting portion 10 of each cradle as shown at 15, the screw thread at one end of the rod 14 being a right hand screw thread and that at the other end being a left hand screw thread. Means are provided for turning the rod 14 for the purpose of moving the two cradle members toward and from each other. In the construction shown the rod 14 is hexagonal in cross section and I have provided a wrench member 16 having an hexagonal aperture through which the rod 14 extends.

Figure 2:
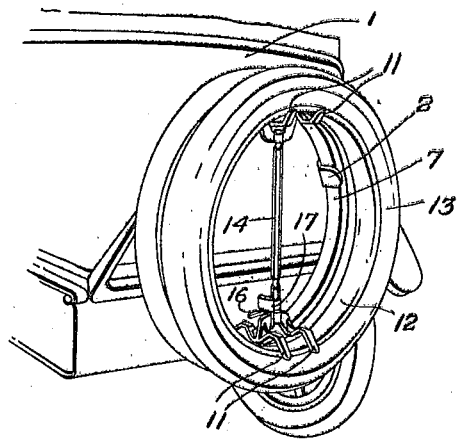
Fig. 2 is a similar view showing an extra spare tire supported by my improved carrier.
Figure 3:
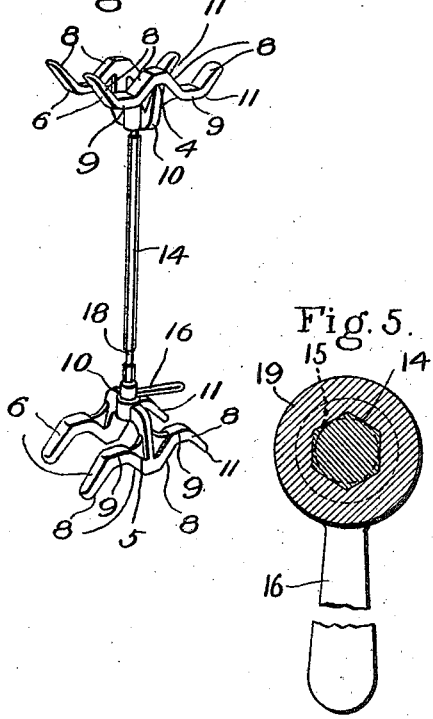
Fig. 3 is a perspective view of the tire carrier.

In using the device the rod 14 is turned in a direction to move the two cradle members toward each other thus contracting the device sufficiently so that the arms 6 may be applied to the regular spare tire carrier or to the rim 7 of the spare tire mounted on said carrier, as shown in Fig. 1. The demountable rim 12 with the second spare tire 13 mounted thereon is then applied to the arms 11, as shown in Fig. 2, and the wrench member 16 is operated to turn the rod 14 thereby to force the cradle members apart and clamp them firmly against the regular spare tire carrier or rim 7 thereon and against the rim 12 of the extra spare tire. The rod 14 serves to hold the two cradle members in their proper position relative to each other and this not only clamps them to the regular spare tire carrier or to the rim 7 but also holds them clamped against the rim 12 of the extra spare tire.

The wrench member 16 is preferably slidably mounted on the rod 14 so that it may be moved up and down on the rod into the most convenient position to be operated.

The tire carrier may be made theft-proof by locking the wrench 16 to one of the cradle members by means of a suitable padlock 17 as shown in Fig. 2. This padlock can conveniently be placed around the connecting portion 10 and the handle of the wrench. In order to apply a lock of this nature it is of course necessary that the handle should have the proper position relative to the connecting portion 10 and I have, therefore, made the rod 14 with the portion 18 of reduced diameter so that by lifting the wrench into the dotted line position Fig. 4, it may be turned about the rod without turning the latter. After the rod 14 has been turned as far as possible in clamping the extra spare tire in position then if the wrench 16 does not come in proper position relative to the connecting portion 10 to permit the lock to be applied, said wrench may be raised into the dotted line position so that it will embrace the portion 18 of reduced diameter and it may then be turned into the proper angular position and then moved outwardly into the full line position Fig. 4.

My tire carrier is very simple and inexpensive to manufacture and will securely hold an extra spare tire in proper position and without allowing it to sag.

Figure 4:
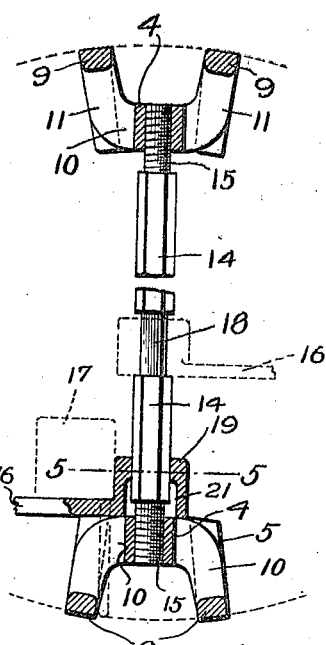
Fig. 4 is an enlarged fragmentary sectional view.

The wrench 16 is provided with a head 19 through which the hexagonal aperture is formed and which is somewhat elongated. The aperture through the head at one end thereof is enlarged somewhat as shown at 21 and the head is long enough so that when the cradles are in operative position and the wrench 16 is resting against the connecting member 10 as shown in Fig. 4, the hexagonal portion of the aperture will still be in engagement with the hexagonal part of the rod while a portion of the screw-threaded part will be occupying the portion 21.

I claim.

1. An extra spare tire carrier for automobiles comprising two cradle members each having a central bridge portion and two separated arms extending laterally therefrom in one direction and adapted to embrace the demountable rim on the regular spare tire holder of an automobile and also having two other separated arms extending laterally therefrom in the opposite direction and adapted to embrace the demountable rim of an extra spare tire, a rod screw-threaded at its ends into said bridge portions, the screw threads at one end of the rod being right hand screw threads and those at the other end being left hand screw threads, and means carried by said rod for turning the latter.

2. An extra spare tire carrier for automobiles comprising two cradle members each having two separated arms adapted to embrace the demountable rim on the regular spare tire holder of an automobile and two other separated arms adapted to embrace the demountable rim of an extra spare tire and a connecting portion connecting said arms, a rod screw-threaded at its ends into said connecting portions, the screw threads at one end of the rod being right hand screw threads and those at the other end being left hand screw threads, and a wrench member permanently connected to but adjustable on said rod and by which it may be turned.

3. An extra spare tire carrier for automobiles comprising two cradle members each having two separated arms adapted to embrace the demountable rim on the regular spare tire holder of an automobile and two other separated arms adapted to embrace the demountable rim of an extra spare tire and a connecting portion connecting said arms, a rod screw-threaded at its ends into said connecting portions, the screw threads at one end of the rod being right hand screwthreads and those at the other end being left hand screwthreads, and a wrench member permanently connected to said rod by which it may be turned, said wrench member being slidably mounted on the rod and the latter having a portion or reduced diameter whereby when the wrench is moved into line therewith it may be turned on the rod without turning the latter.

4. An extra spare tire carrier for automobiles comprising two cradle members each being substantially H-shaped and having two separated arms adapted to embrace the demountable rim on the regular spare tire holder of an automobile and two other separated arms adapted to embrace the demountable rim of an extra spare tire, and a connecting portion connecting said arms, and means for forcing said members apart thereby to clamp them to the demountable rims.

5. An extra spare tire carrier for automobiles comprising two cradle members each being substantially H-shaped and having a central bridge member, two separated arms extending laterally therefrom in one direction and adapted to embrace the demountable rim on the regular spare tire holder of an automobile, two other separated arms extending laterally from the bridge member in the opposite direction and adapted to embrace the demountable rim of an extra spare tire, a rod screw-threaded at its ends into said bridge portions, the screw threads at one end of the rod being right hand screw threads and on the other end being left hand screw threads and the central portion of said rod being non-circular, and a wrench member for turning the rod, said wrench member being slidably mounted on the rod and having a non-circular opening which fits the latter.

In testimony whereof, I have signed my name to this specification.

PATRICK J. CASSIDY.